O. V. FLOREY.
Vise for Carpenters' Use.
No. 2,126. Reissued Dec. 19, 1865.
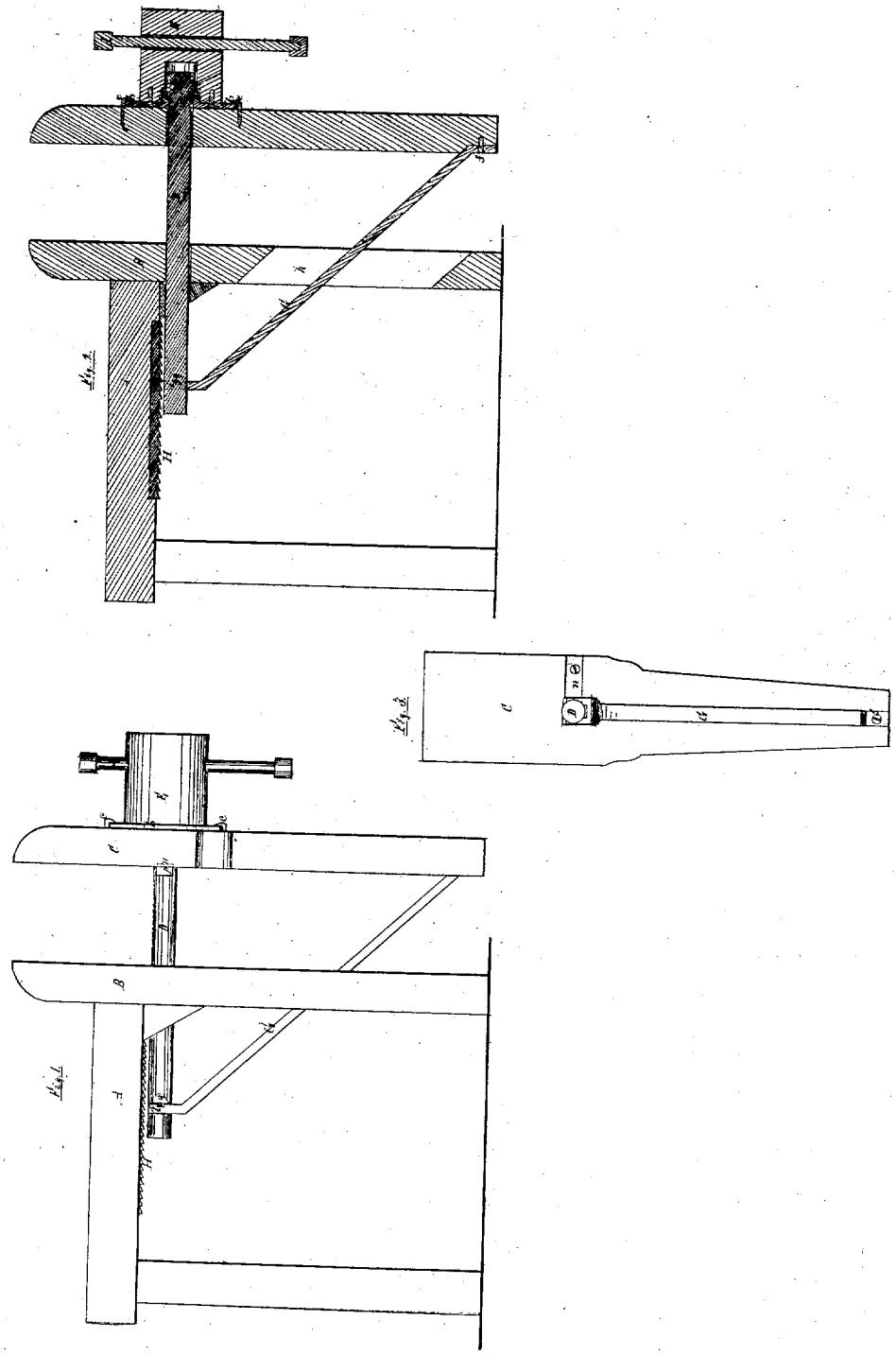
N. PETERS, Photo-Lithographer, Washington, D. C.

UNITED STATES PATENT OFFICE.

ORLANDO V. FLOREY, OF YELLOW SPRINGS, OHIO.

IMPROVEMENTS IN VISES FOR CARPENTERS' USE.

Specification forming part of Letters Patent No. 14,603, dated April 8, 1856; Reissue No. 2,126, dated December 19, 1865.

*To all whom it may concern:*

Be it known that I, O. V. FLOREY, of Yellow Springs, in the county of Greene and State of Ohio, have invented a new and Improved Vise; and I do hereby declare that the following is a full and exact description thereof, reference being had to the accompanying drawings, making part of this specification—

Figure 1 being a side elevation of the vise; Fig. 2, a vertical section thereof; Fig. 3, a view of the inner face of the movable jaw, with the sliding beam and ratchet-brace thereon.

Like letters designate corresponding parts in all the figures.

The nature of my invention consists in the employment of a brace extending from the lower end of the movable jaw to the rear end of the beam, and to a ratch behind the stationary jaw, arranged in such a manner as to keep the jaws parallel, and so that its weight will disengage it from the ratch when the jaws are not tightened against any article; but the act of pressing the movable jaw against any article will force the brace against the ratch, and thus retain the jaw in that position.

The jaws may be constructed in the ordinary manner, and the stationary jaw B secured, as usual, to a bench, A. Behind this jaw a ratch, H, is secured, generally to the under side of the bench, or it may be permanently attached to the jaw itself. A sliding beam, D, passes through the stationary jaw B, and also through the movable jaw C, in which it is secured by a notch, *p*, in the beam, and a stop, *n*, on the jaw, or by any other suitable device. A rigid brace, G, is secured at *f* to the lower end of the movable jaw, and extends thence through a slot, *h*, Fig. 2, in the stationary jaw, to the rear end of the sliding beam D, which it embraces or passes through, so that the beam cannot move without moving it also. The upper end, *i*, of the brace reaches up to the ratch H, and is sharpened so as to fit into the notches thereof. The brace is supported at its upper end by the rear end of the beam, in any suitable manner which will give sufficient vertical play or movement thereon to allow the brace to be engaged with or disengaged from the ratch.

The movable jaw C should be allowed a little angular play upon the sliding beam D, so that when it is not pressed against any article the weight of the brace will force the lower end of said jaw a little out of its vertical position. This movement lowers the upper end of the brace sufficiently to disengage it from the ratch, as represented in the drawings. In this condition the movable jaw can be pushed in or out at pleasure, there being nothing to prevent a free motion thereof. Therefore when an article is to be held in the vise the movable jaw is drawn out sufficiently to admit the article, and then immediately pushed inward against it. The moment the upper end of the jaw strikes the article the pressure outward against said jaw pushes the lower end thereof inward and thus forces the ratchet brace into one of the notches of the ratch, and the harder the pressure against the article clamped the greater the force which holds the brace against said ratch.

To tighten the jaws against the article, a nut, E, is employed, screwing upon a screw-thread, *a*, on one end of the nut, and being secured either to the movable jaw C, as shown in the drawings, or to the brace, according to which end of the sliding beam the screw-thread is formed on. In the former case the jaws are tightened by turning the nut, and in the other case by turning the beam in the nut. To unclamp, the nut E is loosened till the article is set free, and then the beam is ready, by its automatic action, to be moved either directly in or out.

What I claim as my invention, and desire to secure by Letters Patent, is—

The use of the ratchet-brace G, operating in connection with the ratch H, sliding beam D, movable jaw C, and nut E, substantially in the manner herein set forth.

The above specification of my improved vise signed by me this 23d day of December, 1864.

ORLANDO V. FLOREY.

Witnesses:
THOS. K. MELVIN,
J. C. WHITE.